United States Patent
Ganusov et al.

(10) Patent No.: US 9,836,568 B1
(45) Date of Patent: Dec. 5, 2017

(54) PROGRAMMABLE INTEGRATED CIRCUIT DESIGN FLOW USING TIMING-DRIVEN PIPELINE ANALYSIS

(71) Applicant: Xilinx, Inc., San Jose, CA (US)

(72) Inventors: Ilya K. Ganusov, San Jose, CA (US); Aaron Ng, Santa Clara, CA (US); Ronald E. Plyler, West Linn, OR (US); Sabyasachi Das, San Jose, CA (US); Frederic Revenu, San Carlos, CA (US)

(73) Assignee: XILINX, INC., San Jose, CA (US)

( * ) Notice: Subject to any disclaimer, the term of this patent is extended or adjusted under 35 U.S.C. 154(b) by 5 days.

(21) Appl. No.: 15/069,524

(22) Filed: Mar. 14, 2016

(51) Int. Cl.
  *G06F 9/455* (2006.01)
  *G06F 17/50* (2006.01)

(52) U.S. Cl.
  CPC ...... *G06F 17/5072* (2013.01); *G06F 17/5081* (2013.01)

(58) Field of Classification Search
  CPC ............ G06F 17/5054; G06F 2217/84; G06F 17/5081; G06F 17/5031; G06F 17/5072; G06F 9/3869
  See application file for complete search history.

(56) References Cited

U.S. PATENT DOCUMENTS

| | | | |
|---|---|---|---|
| 6,484,298 B1 | 11/2002 | Nag et al. | |
| 7,076,515 B2 * | 7/2006 | Chen | G06F 17/148 708/400 |
| 7,162,704 B2 * | 1/2007 | Oktem | G06F 17/5059 716/114 |
| 8,578,311 B1 * | 11/2013 | Baumgartner | G06F 17/5081 716/107 |
| 8,677,298 B1 * | 3/2014 | Manohararajah | G06F 17/5054 716/116 |
| 8,863,059 B1 * | 10/2014 | Fung | G06F 17/5054 716/108 |
| 8,893,071 B1 * | 11/2014 | Gaide | G06F 17/5054 716/113 |
| 8,896,344 B1 * | 11/2014 | Lewis | H03K 19/177 326/38 |
| 2004/0163053 A1 * | 8/2004 | Snider | G06F 17/5045 716/103 |
| 2005/0108696 A1 * | 5/2005 | Dai | G06F 8/456 717/151 |

(Continued)

OTHER PUBLICATIONS

Altera, "Hyper-Pipelining for Stratix 10 Designs," AN715, Jun. 8, 2015, pp. 1-29, Altera Corporation, San Jose, California, USA.

(Continued)

*Primary Examiner* — Nha Nguyen
(74) *Attorney, Agent, or Firm* — Kevin T. Cuenot

(57) ABSTRACT

Improving timing of a circuit design may include determining, using a processor, critical feed-forward paths of the circuit design, determining, using the processor, a sequential loop having a largest loop delay within the circuit design, and iteratively cutting, using the processor, the critical feed-forward paths and feed-forward paths parallel to the cut critical feed-forward paths until a stopping condition is met. The stopping condition may be determined according to the largest loop delay. The circuit design may be modified by inserting a register at each cut feed-forward path.

20 Claims, 6 Drawing Sheets

(56) References Cited

U.S. PATENT DOCUMENTS

2008/0276209 A1* 11/2008 Albrecht ............ G06F 17/5031
716/113
2010/0318772 A1* 12/2010 Sudhakar ............ G06F 9/30032
712/222
2016/0371403 A1* 12/2016 Sinnadurai .......... G06F 17/5081

OTHER PUBLICATIONS

Altera, "Quartus II Handbook Version 13.1," QII52005-13.1.0, Nov. 2013, vol. 2, Chapter 12, pp. 12-1 to 12-46, Altera Corporation, San Jose, California, USA.

Altera, "Quartus II Handbook Version 13.1," QII52007-13.1.0, Nov. 2013, vol. 2, Chapter 16, pp. 16-1 to 16-16, Altera Corporation, San Jose, California, USA.

Chacko, James et al., "FPGA-Based Latency-Insensitive OFDM Pipeline for Wireless Research," Proc. of the 2014 IEEE High Performance Extreme Computing Conference, Sep. 9, 2014, pp. 1-6, IEEE, Piscataway, New Jersey, USA.

Devlin, Benjamin et al., "Throughput Optimization by Pipeline Alignment of a Self Synchronous FPGA," Proc. of the 2009 International Conference on Field-Programmable Technology, Dec. 9, 2009, pp. 312-315, IEEE, Piscataway, New Jersey, USA.

Hung, Eddie et al., "Transparent Insertion of Latency-Oblivious Logic onto FPGAs," 2014 24th International Conference on Field Programmable Logic and Applications, Sep. 2, 2014, pp. 1-8, IEEE, Piscataway, New Jersey, USA.

Murray, Kevin E. et al., "Quantifying the Cost and Benefit of Latency Insensitive Communication on FPGAs," Proc. of the 2014 ACM/SIGDA International Symposium on Field-Programmable Gate Arrays, Feb. 26, 2014, pp. 223-232, ACM, New York, New York, USA.

Nuutila, Esko, "On Finding the Strongly Connecgted Components in a Directed Graph," Information Processing Letters, Jan. 1994, vol. 49, Issue 1, pp. 9-14, Elsevier B.V., Philadelphia, Pennysylvania, USA.

Synopsys, "DC Ultra" Datasheet, copyright 2015, pp. 1-4, Synopsys, Inc., Mountain View, California, USA.

Synopsys, "Synplify Premier" brochure, copyright 2011, pp. 1-4, Synopsys, Inc., Mountain View, California, USA.

Syed, Arshid, "Pipelining with DesignWare Building Block IP," copyright 2016, downloaded Mar. 14, 2016, pp. 1-3, Synopsys, Inc., Mountain View, California, USA.

Tarjan, Robert, "Depth-First Search and Linear Graph Algorithms," SIAM Journal on Computing, Jun. 1972, vol. 1, No. 2, pp. 146-160, Society for Industrial and Applied Mathematics, Philadelphia, Pennysylvania, USA.

Cadence, "Synthesis and Optimization—Continually Improving Runtimes, QOR, and Usability," Jan. 27, 2003, Cadence Design Systems, Inc., San Jose, California, USA.

Specification and drawings for U.S. Appl. No. 14/494,978, filed Sep. 24, 2014, Chandrakar et al.

* cited by examiner

PROGRAMMABLE INTEGRATED CIRCUIT DESIGN FLOW USING TIMING-DRIVEN PIPELINE ANALYSIS

TECHNICAL FIELD

This disclosure relates to integrated circuits (ICs) and, more particularly, to improving timing of circuit designs for integrated circuits using timing-driven pipeline analysis to pipeline the circuit designs.

BACKGROUND

Integrated circuits (ICs) can be implemented to perform a variety of functions. Some ICs can be programmed to perform specified functions. One example of an IC that can be programmed is a field programmable gate array (FPGA). An FPGA typically includes an array of programmable tiles. These programmable tiles may include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable elements that may include, for example, function generators, registers, arithmetic logic, and so forth.

The programmable interconnect and programmable logic circuitries are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits, referred to as a configuration bitstream, provided to the device for that purpose. The data bits may be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs may also be implemented in other ways, e.g., using fuse or antifuse technology. The phrase "programmable IC" may include, but is not limited to, these devices and further may encompass devices that are only partially programmable. For example, one type of programmable IC includes a combination of hard-coded transistor logic and a programmable switch fabric that programmably interconnects the hard-coded transistor logic.

Creating circuit designs for implementation within a programmable IC such as an FPGA is a complex process. One reason for this complexity is the aggressive timing requirements often set forth for the circuit designs. A significant amount of time is spent by designers in an attempt to create circuit designs that meet these aggressive timing requirements.

Typically, the timing of a circuit design may be expressed as slack measurements on a per signal path (path) basis. "Slack," in reference to a circuit design, is the difference between a required arrival time of a signal at a circuit element, e.g., a signal arriving at a load of a net from the source, and an estimated arrival time of the signal at the circuit element for a path. A positive slack indicates that the path meets the timing requirement for the path. The signal is estimated to arrive at the destination prior to the required arrival time specified by the timing requirement. A negative slack indicates that the path does not meet the timing requirement for the path. The estimated arrival time of a signal to the load of the path is after the required arrival time specified by the timing requirement.

SUMMARY

A method of improving timing of a circuit design may include determining, using a processor, critical feed-forward paths of the circuit design and determining, using the processor, a sequential loop having a largest loop delay within the circuit design. The method also may include iteratively cutting, using the processor, the critical feed-forward paths and feed-forward paths parallel to the cut critical feed-forward paths until a stopping condition determined according to the largest loop delay is met. The method may also include modifying, using the processor, the circuit design by inserting a register at each cut feed-forward path.

An apparatus for improving timing of a circuit design may include a processor. The processor may be configured to initiate executable operations. The executable operations may include determining critical feed-forward paths of the circuit design and determining a sequential loop having a largest loop delay within the circuit design. The executable operations may also include iteratively cutting the critical feed-forward paths and feed-forward paths parallel to the cut critical feed-forward paths until a stopping condition determined according to the largest loop delay is met. The executable operations further may include modifying the circuit design by inserting a register at each cut feed-forward path.

A computer program product includes a computer readable storage medium having program code stored thereon. The program code is executable by a processor to perform operations. The operations include determining, using the processor, critical feed-forward paths of the circuit design and determining, using the processor, a sequential loop having a largest loop delay within the circuit design. The operations also may include iteratively cutting, using the processor, the critical feed-forward paths and feed-forward paths parallel to the cut critical feed-forward paths until a stopping condition determined according to the largest loop delay is met. The method may also include modifying, using the processor, the circuit design by inserting a register at each cut feed-forward path.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION OF THE DRAWINGS

Figure 1:
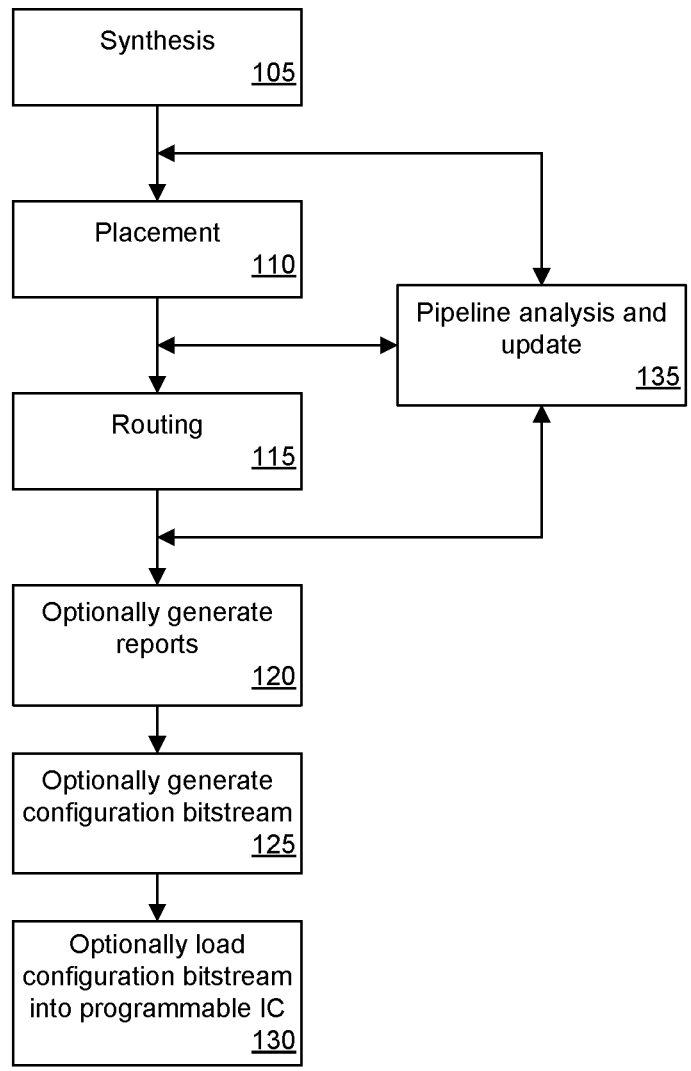
FIG. 1 is a diagram illustrating an exemplary implementation flow for a circuit design.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to improving timing of circuit designs for ICs using a timing-driven pipeline analysis to pipeline the circuit designs. In accordance with the inventive arrangements described within this disclosure, the timing of a circuit design may be analyzed to identify critical paths. One or more of the critical paths may be pipelined. In addition to pipelining the critical paths, any paths determined to be parallel to a pipelined critical path may also be pipelined. The parallel paths may be pipelined in order to preserve the correctness of the circuit design.

In general, feed-forward paths of a circuit design are paths that can be pipelined. Feedback paths of a circuit design are paths within sequential loops. Generally, sequential loops, including the feedback paths, may not be pipelined. In processing paths of the circuit design to determine which paths may be pipelined, feed-forward paths are distinguished from feedback paths to avoid the introduction of errors into the circuit design by pipelining feedback paths.

The timing improvement of a circuit design achieved through pipelining may be constrained by delays of the sequential loops in the circuit design. Timing improvement refers to the increase in maximum operating frequency of the circuit design or a portion of the circuit design. Because feedback paths are generally not pipelined, the maximum operating frequency of a circuit design may be constrained by the loop delays of sequential loops. In this regard, the critical feed-forward paths of the circuit design may be pipelined until a stopping condition is met. The stopping condition may depend, at least in part, upon the timing of the pipelined path in relation to the loop delays.

In one example, the various aspects of the circuit design implementation flow generally described above may be performed on a per-clock domain basis. The techniques may be iterated for one or more or all clock domains of the circuit design, thereby automatically pipelining the circuit design. In another example, the circuit design implementation flow may be performed on a circuit design independently based upon a hierarchy of the circuit design as opposed to clock domain(s). A hierarchy-based approach provides more granularity in analysis of the design. For example, in the case of latency-insensitive circuit designs, some blocks may be pipelined in isolation despite the blocks being part of the same clock domain.

Subsequent to the automated pipelining of the circuit design, the operation of the circuit design is improved. The pipelined circuit design has an operating frequency that is higher than was the case prior to pipelining, thereby increasing performance of the circuit design. Further, while the resulting circuit design may be functionally equivalent to the circuit design prior to processing, the resulting circuit design is structurally different through the insertion of registers.

The inventive arrangements include a method performed by a data processing system that modifies a circuit design to improve timing of circuitry specified by the circuit design. In another aspect, the inventive arrangements include an apparatus configured to analyze and automatically modify a circuit design as described herein. In still another aspect, the inventive arrangements may be implemented as a computer program product including a computer-readable storage medium storing program code that, when executed, causes a processor to perform and/or initiate a method that modifies a circuit design to improve timing of circuitry specified by the circuit design.

FIG. 1 is a diagram illustrating an exemplary implementation flow 100 for a circuit design. Implementation flow 100 may be performed by a data processing system executing program code such as electronic design automation (EDA) software (hereafter "the system"). An implementation flow, as performed by the system, includes multiple, different phases. These phases generally include synthesis, placement, and routing. As illustrated in FIG. 1, the system may perform pipeline analysis and update 135 at one or more different locations within implementation flow 100.

In block 105, the system performs synthesis on a circuit design. Synthesis is the process of converting, or translating, an abstract, programmatic description of a circuit into a low-level design implementation. The abstract, programmatic description of the circuit describes behavior of the circuit and is also referred to as a "behavioral description" or a "register transfer level (RTL) description" of the circuit. The behavioral description is often specified using a hardware description language (HDL). The low-level design implementation generated through synthesis typically is specified as inter-connected logic gates.

In one aspect, synthesis also includes mapping. Mapping is the process of correlating, or matching, the logic gates of the low-level circuit design to the various types of physical circuit blocks that are actually available in the particular IC in which the circuit design is to be implemented, i.e., the "target IC." For example, since a lookup table (LUT) may implement a complex function, one or more logic gates of the low-level design implementation may be mapped to a single LUT, or other programmable tile of the target IC. The mapped circuit design specifies the same functionality as the low-level design implementation, albeit in terms of the particular circuit blocks available on the target IC as opposed to low-level logic gates.

Subsequent to block 105 and prior to block 110, the system may optionally perform pipeline analysis and update in block 135. As will be described herein in greater detail, pipeline analysis and update may include modifying the circuit design through the automated insertion of registers into paths (e.g., performing pipelining).

In block 110, the system performs placement. Placement is the process of assigning elements of the synthesized circuit design to particular instances of circuit blocks and/or resources having specific locations on the target IC. Once placed, a circuit element of the circuit design has a specific location on the target IC as opposed to only being assigned to a particular type of circuit block and/or resource as is the case after mapping and prior to placement. The location of a circuit element of a circuit design, once placed, is the location on the target IC of the instance of the circuit block and/or resource to which the circuit element is assigned.

Subsequent to block 110 and prior to block 115, the system may optionally perform pipeline analysis and update in block 135. In block 115, the system performs routing. Routing is the process of selecting particular routing resources such as wires, programmable interconnection points (PIPs), PIP settings, and/or other interconnect circuitry to electrically couple the various circuit blocks of the target IC after placement. Subsequent to block 115 and prior to block 120, the system may optionally perform pipeline analysis and update in block 135.

It should be appreciated that as each of blocks 105, 110, and/or 115 is performed, the system generates a new version of the circuit design or updates the existing circuit design with the information generated in each respective block. Similarly, the system may update the circuit design and/or generate a new circuit design with any information or changes generated from performing block 135.

Regarding block 135, the system performs pipeline analysis and update one or more times, e.g., at one or more of the locations indicated within FIG. 1. For example, the system may perform pipeline analysis and update only between blocks 105 and 110; only between blocks 110 and 115; only between blocks 115 and 120; between blocks 105 and 110 and also between blocks 110 and 115; between blocks 110 and 115 and also between blocks 115 and 120; or between blocks 105 and 110, between blocks 110 and 115, and also between blocks 115 and 120.

Continuing with block 120, the system may optionally generate reports. The reports indicate changes and/or timing improvements for the circuit design achieved through pipelining. In one aspect, as part of block 120, the system may indicate available pipelining for the circuit design. In another aspect, the system indicates whether the circuit design meets established timing requirements by performing pipeline analysis and update in block 135.

In block 125, the system may optionally generate a configuration bitstream. The configuration bitstream, responsive to being loaded into configuration memory of a programmable IC, implements the circuitry specified by the resulting circuit design within the programmable IC. Accordingly, in block 130, the system may optionally load the configuration bitstream into the programmable IC, thereby physically implementing the circuitry specified by the circuit design post pipelining within the programmable IC.

Figure 2:
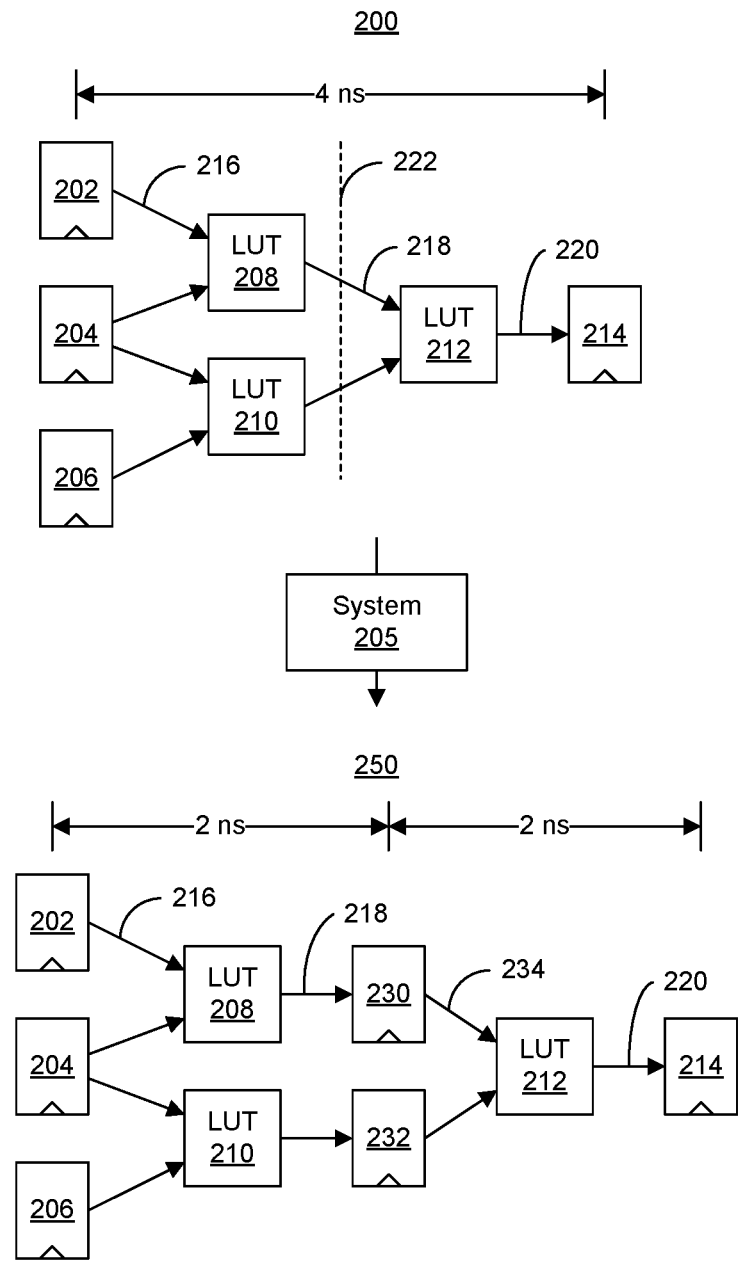
FIG. 2 is a block diagram illustrating an example of pipelining a circuit design.

FIG. 2 is a block diagram illustrating an example of pipelining a circuit design. FIG. 2 illustrates a circuit design 200 prior to pipeline analysis and update as performed by a system 205. Circuit design 200 may be synthesized, placed, or routed as described with reference to FIG. 1. System 205 performs pipeline analysis and update on circuit design 200 to generate modified circuit design 250. FIG. 2 illustrates that pipelining a circuit design increases the maximum operating frequency of the circuit design by introducing registers on critical paths that reduce the number of gates and the wire distance that a signal must traverse in one clock cycle.

In the example of FIG. 2, circuit design 200 includes a plurality of registers 202, 204, 206, and 214. Circuit design 200 further includes LUTs 208, 210, and 212. Registers 202, 204, 206, and 214 are synchronous (i.e., clocked) circuit elements. LUTs 208, 210, and 212 are asynchronous circuit elements, e.g., combinatorial logic, that are not clocked. The path formed of wires 216, 218, and 220 linking register 202 to LUT 208, to LUT 212, to register 214 is a critical path having a delay of 4 ns. A 4 ns delay corresponds to a maximum operating frequency of 250 MHz for circuit design 200.

As defined herein, the term "signal path" or "path," means a connection, e.g., wire(s), between at least two endpoints. Each endpoint of the path is a synchronous, or clocked, circuit element. One or more combinatorial, or un-clocked, circuit elements may be in the path. A path may be formed by a connection between a source and one or more loads of the source of a net.

The term "critical path," as defined herein, means a path having a negative slack. The term "critical path" may also refer to a path having a largest delay of a defined set of feed-forward paths that is the limiting path for purposes of determining maximum operating frequency for the set of paths. In this regard, a critical path may not have negative slack, but be the slowest path in a group of paths. For example, the group of paths being considered may be defined according to clock domain and may include only feed-forward paths of the clock domain.

In the example of FIG. 2, system 205, responsive to performing a pipeline analysis, may establish a cut in circuit design 200 as illustrated by cut-line 222. A cut is a break in a path in which a circuit element may be inserted. Insertion of the circuit element links the severed, or cut, portions of the path. System 205 may insert registers at the location of cut-line 222 in the critical path and at the location of cut-line 222 in any paths that are determined to be parallel to the critical path. Inserting extra registers, e.g., performing pipelining, improves the performance of circuit design 200 by reducing the length of the critical path.

Circuit design 250 shows that system 205 has inserted registers 230 and 232. System 205 inserts register 230 into the critical path at the location of cut-line 222. System 205 inserts register 232 into the path determined to be parallel to the critical path at the location of cut-line 222. Register 232 is inserted to ensure that circuit design 250, as modified, continues to operate correctly (e.g., as intended). The critical path of circuit design 200 is now formed of wires 216, 218, 234, and 220 in circuit design 250. Further, in circuit design 250, the resulting path may be traversed in two clock cycles, where wires 216 and 218 are traversed in a first clock cycle and wires 234 and 220 are traversed in a second clock cycle. Each of the two legs may require 2 ns to traverse. As such, the operating frequency of circuit design 250 has increased to 500 MHz.

As discussed, insertion of register 232 preserves functional correctness of the circuit design. Insertion of a register on a critical path also requires pipelining on all paths parallel to the critical path with the exception of paths that are part of sequential loops. While register 232 preserves the functional correctness of the circuit design, in another example, register 232 may be inserted elsewhere in the circuit design. For example, latency of parallel paths may be balanced by inserting registers on the inputs of LUT 210. Selecting the location illustrated in FIG. 2 requires only one register while placing registers at the inputs of LUT 210 would require two registers. Thus, in another example, in selecting a location to insert a register on a path, whether a critical path or a parallel path, the system may select a location that results in fewer, or the fewest, registers being added.

Figure 3:
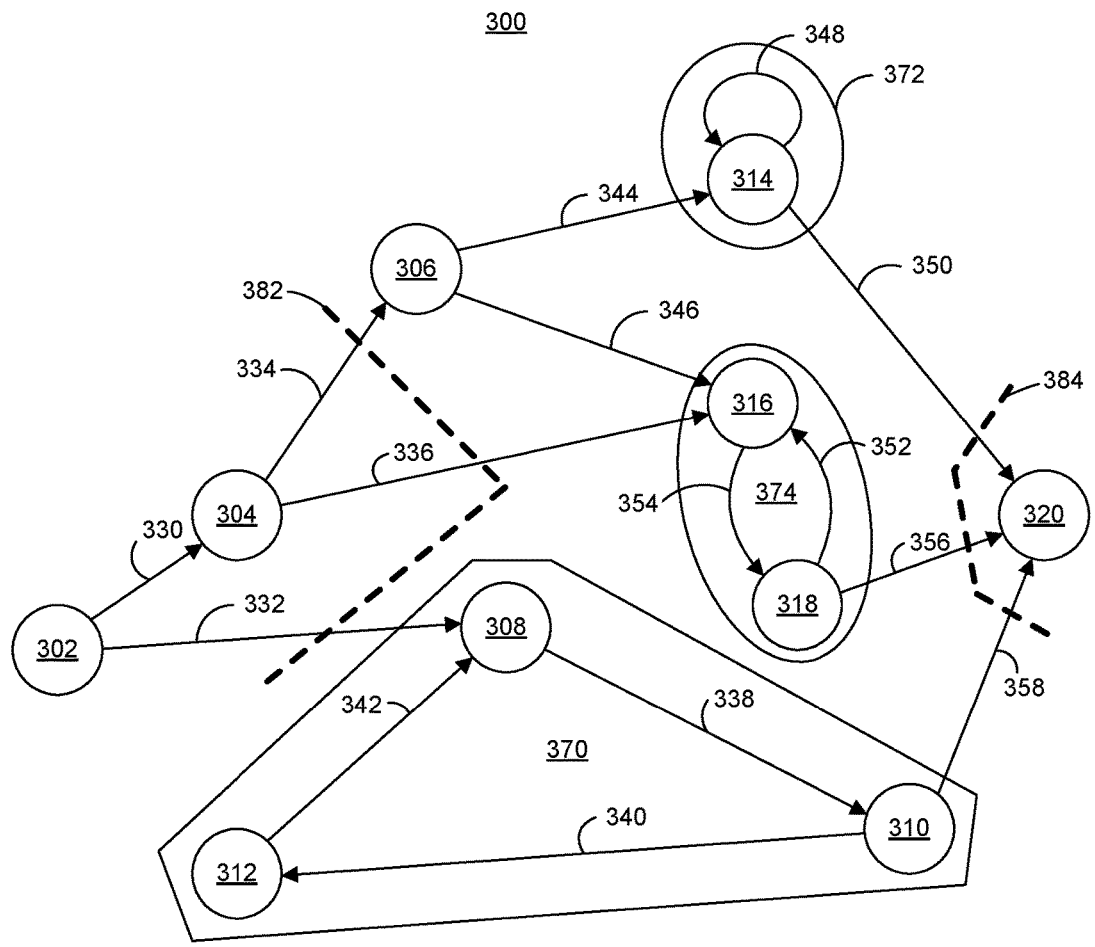
FIG. 3 is a diagram illustrating another example of pipelining a circuit design.

FIG. 3 is a diagram illustrating another example of pipelining a circuit design. FIG. 3 illustrates a circuit design 300. Circuit design 300 includes sequential circuit elements 302, 304, 306, 308, 310, 312, 314, 316, 318, and 320. Paths 330, 332, 334, 336, 338, 340, 342, 344, 346, 348, 350, 352, 354, 356, and 358 between sequential circuit elements 302-320 are shown as arrows. For purposes of illustration, combinatorial circuit elements that may exist in paths 330-358 between different ones of sequential circuit elements 302-320 are not shown. Circuit design 300 further includes a plurality of sequential loops 370, 372, and 374. For purposes of discussion, circuit design 300 includes a single clock domain.

In general, a sequential loop is portion of a circuit or circuit design in which any sequential circuit element has a path back to itself. Any paths within a sequential loop may be referred to as feedback paths. Paths outside of sequential loops may be referred to as feed-forward paths. For example, paths 330 and 332 are feed-forward paths, while paths 338, 340, 342, and 348 are feedback paths. In accordance with the inventive arrangements described herein, feed-forward paths may be pipelined while feedback paths are not pipelined. In general, extra pipelining of sequential loops cannot guarantee functional correctness. As such, the system distinguishes between feed-forward paths and feedback paths in circuit design 300. Further, the overall speed of circuit design 300 that may be achieved through pipelining is constrained by the delay of sequential loops 370, 372, and 374 contained therein.

In one exemplary arrangement, the system may process circuit design 300 to locate sequential loops 370, 372, and 374. The system may determine the loop delay for each of the identified sequential loops. The largest loop delay may be considered by the system to be a limitation on the maximum operating frequency of circuit design 300 attainable through pipelining. The system further may determine the maximum operating frequency of circuit design 300, the latency of circuit design 300, and the cost in terms of the number of registers that added to achieve the maximum operating frequency.

In determining paths to cut, the system may distinguish between feed-forward paths and feedback paths since feedback paths are not pipelined. Further, sequential loops 370, 372, and 374, for purposes of determining cuts, may be considered single circuit elements and, as such, may not be severed (e.g., cut). In this regard, feedback paths are excluded from consideration for purposes of identifying critical paths and/or for cutting.

In the example of FIG. 3, the system establishes cuts in circuit design 300 as indicated by cut-lines 382 and 384. For purposes of illustration, consider the case where paths 334 and 350 are critical paths. The system may cut path 334 as a critical path and insert a register at the location where cut-line 382 passes through path 334. The system may also cut path 336 and path 332 as the parallel path to path 334 and insert a register at the location where cut-line 382 passes through path 336 and where cut-line 382 passes through path 332. As discussed, the system must pipeline each feed-forward path that is parallel to the critical feed-forward path that is pipelined to preserver correctness of the circuit design.

As defined herein, each path that is not in the transitive fanin and not in the transitive fanout of the path that is cut is a parallel path to the cut path. Transitive fanin and transitive fanout mean that there is either a direct or indirect path between sequential circuit elements. Referring to path 334, path 330 is in the transitive fan-in of path 334. As such, path 330 is not parallel to path 334. Paths 344, 346, 350, and 356 are in the transitive fan-out of path 334. Accordingly, paths 344, 346, 350, and 356 are not parallel to path 334. Paths that are included in sequential loops 370, 372, and 374 are excluded from consideration as parallel paths. As such, paths 338, 340, and 342 of sequential loop 370; path 348 of sequential loop 372; and paths 352 and 354 of sequential loop 374 are not parallel to path 334. The remaining path, i.e., paths 336, 332, and 358 are considered parallel to path 334.

The system, however, may perform the pipelining at one or more different locations. For example, rather than insert a register at the location where cut-line 382 passes through path 332, the system may insert a register at a point along path 358. Placing a register on path 332 is functionally equivalent to placing a register on path 358. In each case, correctness of circuit design 300 is preserved.

In one exemplary implementation, the system is configured to select a path to cut that has fewer sequential loops following the cut point. Referring to the example where insertion of a register on path 332 is functionally equivalent to path 358, the system may choose to cut path 358 since no sequential loops come after path 358, whereas sequential loop 370 follows path 332. This approach, i.e., selecting the path with the fewest sequential loops following when confronted with functionally equivalent cut choices, avoids situations where some sequential loops require the insertion of additional logic on the inputs of the sequential loop. This technique ensures functional accuracy of the circuit design.

Referring to critical path 350 and cut-line 384, the system may cut path 350 and insert a register at the location where cut-line 384 passes through path 350. The system may also cut paths 356 and 358 as the parallel path to path 350 and insert registers at the locations where cut-line 384 passes through path 356 and 358, respectively.

In processing circuit design 300, the system, having identified sequential loops 370, 372, and 374, treats each sequential loop as an atomic element that may not be cut or otherwise subdivided. Each of the sequential loops is treated as a single sequential circuit element.

Figure 4:
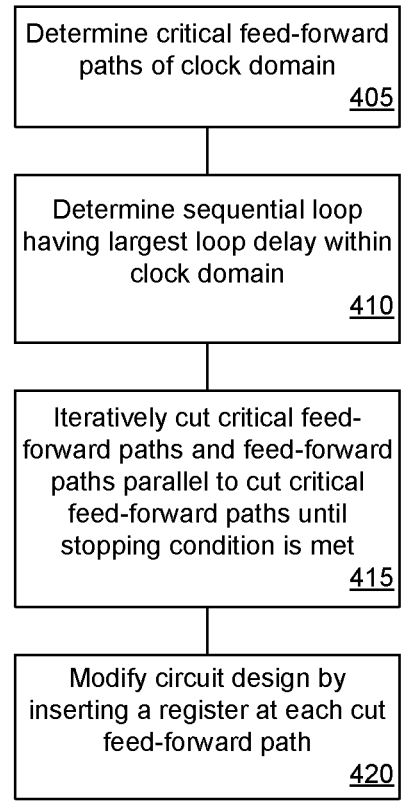
FIG. 4 is a flow chart illustrating an exemplary method of performing pipeline analysis and updating for a circuit design.

FIG. 4 is a flow chart illustrating an exemplary method 400 of performing pipeline analysis and updating for a circuit design. Method 400 is one exemplary implementation of the pipeline analysis and updating process described with reference to FIG. 1 and throughout this disclosure. As such, method 400 may be implemented by a system as described herein and performed at any of a variety of different stages (including a plurality of different stages) of a circuit design implementation flow.

In block 405, the system may determine one or more critical feed-forward paths of a clock domain of a circuit design. In block 410, the system may determine a sequential loop having a largest loop delay of the sequential loops within the clock domain of the circuit design. In block 415, the system may iteratively cut critical feed-forward paths and feed-forward paths parallel to the cut critical feed-forward paths. The system may continue cutting until a stopping condition is met. In block 420, the system may modify the circuit design by inserting a register at each cut feed-forward path. The circuit design may insert a register at each cut critical feed-forward path and at each (cut) feed-forward path determined to be parallel to the cut critical feed-forward path.

Figure 5:
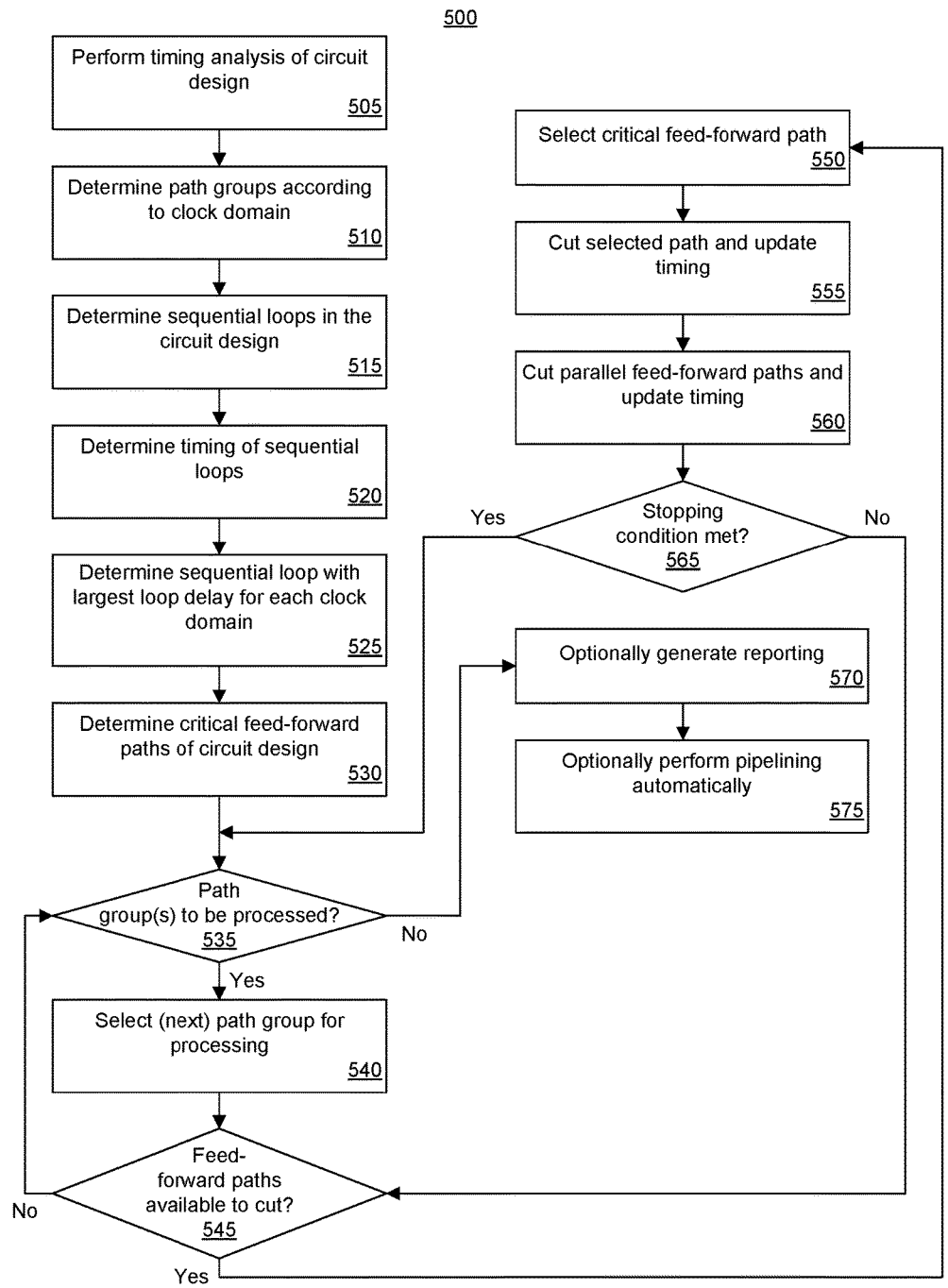
FIG. 5 is a flow chart illustrating another exemplary method of performing pipeline analysis and updating for a circuit design.

FIG. 5 is a flow chart illustrating another exemplary method 500 of performing pipeline analysis and updating for a circuit design. Method 500 is another exemplary implementation of the pipeline analysis and updating process described with reference to FIG. 1 and throughout this disclosure. As such, method 500 may be implemented by a system as described herein and performed at any of a variety of different stages (including a plurality of different stages) of a circuit design implementation flow. FIG. 5 illustrates additional detail relating to the pipeline analysis and update process.

In block 505, the system may perform a timing analysis of the circuit design. The system, for example, may determine the slack for each path identified within the circuit design. In block 510, the system may determine path groups according to clock domain. The system, for example, may form groups of paths where each group corresponds to one different clock domain of the circuit design.

In block 515, the system may determine sequential loops in the circuit design. In recognizing sequential loops, the system distinguishes between those paths that are considered feed-forward paths and those paths that are considered feedback paths. In one example, the system may utilize a technique for detecting strongly connected components in a directed graph for identifying sequential loops. An exemplary technique that may be used is described in Nuutila, et al., "On Finding the Strongly Connected Components in a Directed Graph," Elsevier B.V., 1994.

In block 520, the system may determine the timing of the sequential loops. In one example, the system may determine the loop delay of each sequential loop by disabling feed-forward paths of the circuit design without disabling clocks generated within the circuit design or clocks received from external sources. In block 525, for each clock domain (e.g., for each clock group), the system may determine the sequential loop with the largest loop delay. As defined within this specification, the "loop delay" of a sequential loop means the delay of the path of the sequential loop with the largest delay. For example, in the case of a single cycle sequential loop, the loop delay is the delay of the entire sequential loop. In the case of a multi-cycle sequential loop, e.g., a sequential loop with two or more paths or stages, the loop delay is the slowest path or stage.

In block 530, the system may determine the critical feed-forward paths of the circuit design. For example, the system may determine that each feed-forward path of the circuit design with a negative slack is a critical path. The system may determine criticality on a per-clock domain basis. In another example, the system may determine that each feed-forward path having a negative slack and/or each feed-forward path in each clock domain having a delay that exceeds the largest loop delay in that clock domain is a critical path. In another aspect, the system may exclude any feed-forward paths of the circuit design from being considered critical for purposes of cutting that cross from one clock domain to a different clock domain.

In one exemplary implementation, the system may store only the paths that are to be cut. For example, the system may store only those feed-forward paths determined to be critical and may store the critical feed-forward paths with a clock domain (path group) indicator. By storing only the critical feed-forward paths in program execution memory, the system consumes less memory than other circuit design processes and performs the operations described herein in less runtime than would otherwise be the case. The system need only store these critical paths to be cut and the stopping condition in order to perform the timing comparisons described below. This technique is useful when determining a fast Fmax vs. latency analysis. In other cases where more detailed information is requested such as the number of registers used, the entire circuit design would be loaded into memory to process critical and non-critical paths to balance latency correctly.

In block 535, the system may determine whether there are any path groups to be processed. The system determines whether any of the path groups formed of feed-forward paths have yet to be processed. Responsive to determining that one or more path groups remain to be processed, method 500 may continue to block 540. Responsive to determining that no further path groups remain to be processed, method 500 may proceed to block 570.

In block 540, the system may select a path group, or a next path group as the case may, for processing while method 500 iterates. In block 545, the system may determine whether there are any feed-forward paths to cut. The system may determine the critical feed-forward paths of the selected path group and whether any of the critical feed-forward paths have not yet been pipelined. Responsive to determining that critical feed-forward paths have not yet been pipelined, method 500 may proceed to block 550. Responsive to determining that no further critical feed-forward paths of the path group remain for pipelining, method 500 may loop back to block 535 to select a next path group for processing.

Continuing with block 550, the system may select a critical feed-forward path for processing. In one example, the system may sort the critical feed-forward paths not yet pipelined according to slack. Of the critical feed-forward paths not yet pipelined, the system may select the critical feed-forward path that is the lowest (e.g., has the most negative slack).

In block 555, the system may cut the selected path and update the timing for the resulting paths from the cut. In one example, the system may determine the location along the selected path to cut in order to minimize or reduce the number of registers that are required. For example, in the case where a combinatorial circuit element in the selected path has multiple inputs and a single output, the system may choose to locate a register at the output of that combinatorial element if cutting at the inputs or the outputs would result in an increase in clock frequency. Further, the system may choose to locate a register generally at a midpoint of the selected path.

In block 560, the system may cut each feed-forward path determined to be parallel to the selected path that is cut in block 555 and update timing for the cut parallel paths. In cutting each parallel feed-forward path, the system may also select the location the cut is made so as to minimize and/or reduce the number of register(s) needed. Further, the system may attempt to make cuts close or at midpoints of the parallel feed-forward paths.

In block 565, the system may determine whether a stopping condition is met for processing the current clock domain (e.g., the current path group). If so, method 500 may loop back to block 535 to determine whether any further path groups remain to be processed. If not, method 500 may loop back to block 545 to determine whether any further feed-forward paths of the current path group are available to be cut.

In one example, the stopping condition may be determining that the worst feed-forward path delay of the path group, using the updated timing from blocks 555 and 560, does not exceed the largest loop delay of the clock domain (path group). When the worst feed-forward path delay does not exceed the largest loop delay, pipelining the current path group will not result in any further increase in operating frequency of the clock domain. As such, method 500 may process other path groups.

In another example, the stopping condition may be either the condition described above or when the worst feed-forward path delay of the path group does not exceed a delay of one or more selected types of circuit blocks used in the clock domain and available on the target IC. Exemplary circuit blocks may include, but are not limited to, a global clock buffer, a block random access memory, a LUT random access memory, a shift register LUT, a digital signal processing (DSP) circuit block, or a register-to-register path. The foregoing examples of circuit blocks are treated as atomic circuit blocks that may not be broken down into constituent circuit elements in order to reduce path delays. As such, when the worst feed-forward path delay of the path group is less than or equal to a delay of at least one of the foregoing atomic circuit block examples within the same clock domain, further pipelining of the clock domain need not continue since the examples constrain the maximum operating frequency of the clock domain. Detecting this condition may prevent implementation issues since the programmable circuitry of the target IC is able to operate at higher frequencies than the noted circuit components and configurations.

In another example, the stopping condition may be that the operating frequency of the circuit design, as specified by a design requirement (e.g., an Fmax), is met. Responsive to increasing the maximum operating frequency of the circuit design to the desired operating frequency of Fmax, method 500 may stop processing the current path group and proceed to block 535.

Method 500 may continue to block 570 from block 535 responsive to determining that no further path groups remain to be processed. In block 570, the system may optionally generate a report. The report may specify information such as the latency of the circuit design after pipelining, the difference in latency of the circuit design pre-pipelining compared to post-pipelining, the number of registers used, and the like. In another example, the report may specify the required pipeline stages on clock-domain crossing paths. The report may also provide several pipelining options in terms of incremental improvements in maximum operating frequency that may be obtained by pipelining different signal paths. In one implementation, the report may be partitioned or divided according to clock domain.

In block 575, the system may optionally perform the pipelining automatically. For example, the user may select one of a plurality of pipelining options from the report provided in block 570. Responsive to the user selection, the system may implement the pipelining by inserting registers at cut locations determined by the system and corresponding to the selected pipelining option. The modified circuit design may be stored in memory. As noted with regard to FIG. 1, the circuit design may be further processed to generate a configuration bitstream and/or to load the circuit design within a programmable IC to implement the circuitry specified by the circuit design within the programmable IC.

In another exemplary implementation, the system may perform register insertion automatically at the time that cut locations are determined. For example, the system may automatically insert registers as part of blocks 555 and/or 560 described above.

In still another exemplary implementation, the system may perform method 500 across clock domains. For example, the system may process the circuit design according to criticality of feed forward paths without regard to clock domain.

Table 1 below illustrates an example report that may be generated by the system. Table 1 shows the worst negative slack (WNS) of a feed-forward path as "Current WNS" and the worst negative slack of a feedback path in a sequential loop shown as "Loop WNS" for a selected clock domain and corresponding path group. The current maximum operating frequency is shown as "Current Fmax" and the maximum operating frequency that may be attained through pipelining is shown as "Loop Fmax." Loop Fmax is also the maximum operating frequency of the clock domain as determined from the sequential loop having the worst loop delay for the clock domain. Table 1 illustrates that an improvement of 32.0914% may be obtained by applying pipelining.

TABLE 1

| Clock Name/Path Group | Current WNS | Loop WNS | Current Fmax (period) | Loop Fmax (Period) | Improvement (%) |
|---|---|---|---|---|---|
| ref_clk_in/ ref_clk_in | −0.4 ns | 0.329 ns | 333.328 MHz (3 ns) | 440.298 MHz (2.27 ns) | 32.0914 |

Table 2 illustrates another example report. Table 2 illustrates various degrees of pipelining that may be performed by the system on a circuit design. A user may select a pipeline option. Responsive to the user selection, the system may automatically perform the selected pipelining. Table 2 illustrates different expected maximum operating frequencies for a clock domain of a circuit design for different additional cycles of latency introduced.

TABLE 2

| Extra Latency | Expected Fmax (delay) | Paths to cut |
|---|---|---|
| 1 | 340.013 MHz (2.941 ns) | 183846 |
| 2 | 345.456 MHz (2.895 ns) | 115231 |
| 3 | 351.655 MHz (2.844 ns) | 172367 |
| 4 | 440.298 Mhz (2.271 ns) | 126369 |

Figure 6:
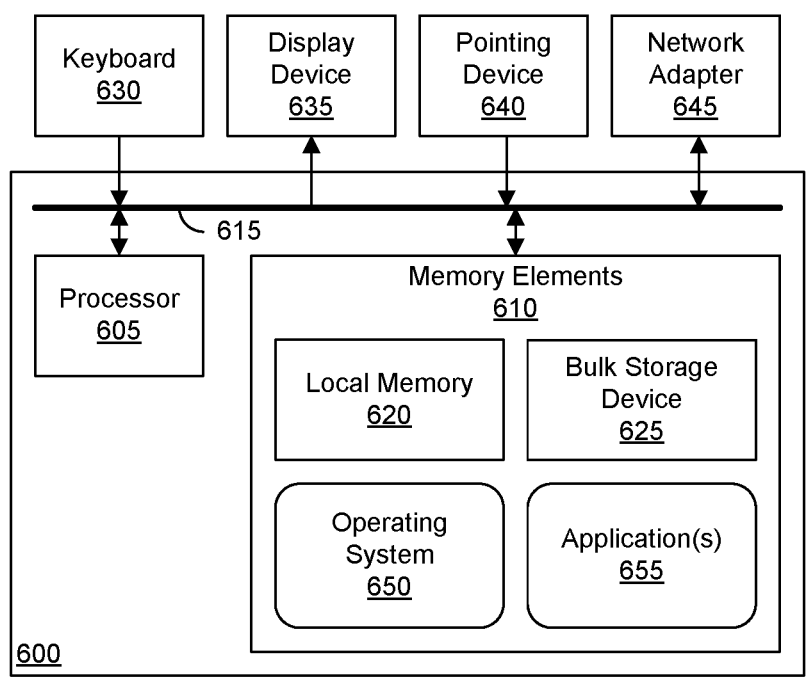
FIG. 6 is a block diagram illustrating an exemplary data processing system.

FIG. 6 is a block diagram illustrating an exemplary data processing system (system) 600. System 600 may be used to perform the various circuit design processing operations described herein.

As pictured, system 600 includes at least one processor, e.g., a central processing unit (CPU), 605 coupled to memory elements 610 through a system bus 615 or other suitable circuitry. System 600 stores computer readable instructions (also referred to as "program code") within memory elements 610. Memory elements 610 may be considered an example of computer readable storage media. Processor 605 executes the program code accessed from memory elements 610 via system bus 615. As used herein, the term "execute" means performing one or more instructions contained in program code.

Memory elements 610 may include one or more physical memory devices such as, for example, a local memory 620 and one or more bulk storage devices 625. Local memory 620 refers to random access memory (RAM) or other non-persistent memory device(s) generally used during actual execution of the program code. Bulk storage device 625 may be implemented as a hard disk drive (HDD), solid state drive (SSD), or other persistent data storage device. System 600 may also include one or more cache memories (not shown) that provide temporary storage of at least some program code in order to reduce the number of times program code must be retrieved from bulk storage device 625 during execution.

Input/output (I/O) devices such as a keyboard 630, a display device 635, a pointing device 640, and one or more network adapters 645 may be coupled to system 600. The I/O devices may be coupled to system 600 either directly or through intervening I/O controllers. In some cases, one or more of the I/O devices may be combined as in the case where a touchscreen is used as display device 635. In that case, display device 635 may also implement keyboard 630 and pointing device 640. Network adapter 645 may be used to couple system 600 to other systems, computer systems, remote printers, and/or remote storage devices through intervening private or public networks. Modems, cable modems, Ethernet cards, and wireless transceivers and/or radios are examples of different types of network adapter 645 that may be used with system 600. Depending upon the particular implementation of system 600, the specific type of network adapter, or network adapters as the case may be, will vary.

As pictured in FIG. 6, memory elements 610 may store an operating system 650 and one or more applications 655. Application 655, for example, may be an EDA application. In one aspect, operating system 650 and application 655, being implemented in the form of executable program code, are executed by system 600 and, in particular, by processor 605. As such, operating system 650 and application 655 may be considered an integrated part of system 600. Operating system 650, application 655, and any data items used, generated, and/or operated upon by system 600 are functional data structures that impart functionality when utilized by system 600.

In one aspect, system 600 may be a computer or other device that is suitable for storing and/or executing program code. System 600 may represent any of a variety of computer systems and/or devices that include a processor and memory and that are capable of performing the operations described within this disclosure. In some cases, the particular computer system and/or device may include fewer components or more components than described. System 600 may be implemented as a single system as shown or as a plurality of networked or interconnected systems each having an architecture the same as, or similar to, that of system 600.

In accordance with the inventive arrangements described within this disclosure, the pipeline analysis and updating described may result in an increase of approximately 10% in the maximum operating frequency of a circuit design. Moreover, the pipeline analysis and updating described require reduced memory in the system thereby increasing runtime.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise. As defined herein, the term "another" means at least a second or more. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, or any suitable combination of the foregoing.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system. As defined herein, the terms "includes," "including," "comprises," and/ or "comprising," specify the presence of stated features, integers, steps, operations, elements, and/or components, but do not preclude the presence or addition of one or more other features, integers, steps, operations, elements, components, and/or groups thereof. As defined herein, the term "plurality" means two or more than two.

As defined herein, the term "hardware description language" is a computer-language that facilitates the documentation, design, and manufacturing of a digital system, such as an integrated circuit. A hardware description language, or HDL, combines program verification techniques with expert system design methodologies. Using an HDL, for example, a user can design and specify an electronic circuit, describe the operation of the circuit, and create tests to verify operation of the circuit. An HDL includes standard, text-based expressions of the spatial and temporal structure and behavior of the electronic system being modeled. HDL syntax and semantics include explicit notations for expressing concurrency. In contrast to most high level programming languages, an HDL also includes an explicit notion of time, which is a primary attribute of a digital system.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context. As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "user" means a human being. The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language and/or procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

One arrangement includes a method of improving timing of a circuit design. The method include determining, using a processor, critical feed-forward paths of the circuit design and determining, using the processor, a sequential loop having a largest loop delay within the circuit design. The method also may include iteratively cutting, using the processor, the critical feed-forward paths and feed-forward paths parallel to the cut critical feed-forward paths until a stopping condition determined according to the largest loop delay is met. The method may also include modifying the circuit design by inserting a register at each cut feed-forward path.

In one aspect, the stopping condition includes determining that a maximum operating frequency of the circuit design meeting a design requirement.

In another aspect, the stopping condition further includes determining that a delay of a most critical feed-forward path of the clock domain no longer exceeds a delay of an atomic circuit block of the circuit design.

The determining critical feed-forward paths, the determining a sequential loop having a largest loop delay, and the iteratively cutting may be performed on a per-clock domain basis.

The method may include sorting the critical feed-forward paths according to slack and selecting critical feed-forward paths for cutting according to worst slack.

In a further aspect, the determining critical feed-forward paths, the determining a sequential loop having a largest loop delay, the iteratively cutting, and the modifying the circuit design are performed subsequent to synthesis of the circuit design.

The method may also include generating a configuration bitstream from the circuit design, wherein the configuration bitstream, when loaded into a programmable integrated circuit, implements the modified circuit design within the programmable integrated circuit.

Another arrangement includes an apparatus for improving timing of a circuit design. The apparatus includes a processor configured to initiate executable operations. The executable operations may include determining critical feed-forward paths of the circuit design and determining a sequential loop having a largest loop delay within the circuit design. The executable operations may also include iteratively cutting the critical feed-forward paths and feed-forward paths parallel to the cut critical feed-forward paths until a stopping condition determined according to the largest loop delay is met. The executable operations further may include modifying the circuit design by inserting a register at each cut feed-forward path.

In one aspect, the stopping condition includes determining that a maximum operating frequency of the circuit design meeting a design requirement.

In another aspect, the stopping condition further includes determining that a delay of a most critical feed-forward path of the clock domain no longer exceeds a delay of an atomic circuit block of the circuit design.

The determining critical feed-forward paths, the determining a sequential loop having a largest loop delay, and the iteratively cutting may be performed on a per-clock domain basis.

The processor may be configured to initiate executable operations further including sorting the critical feed-forward paths according to slack and selecting critical feed-forward paths for cutting according to worst slack.

In a further aspect, the determining critical feed-forward paths, the determining a sequential loop having a largest loop delay, the iteratively cutting, and the modifying the circuit design are performed subsequent to synthesis of the circuit design.

The processor may be configured to initiate executable operations further including generating a configuration bitstream from the circuit design, wherein the configuration bitstream, when loaded into a programmable integrated circuit, implements the modified circuit design within the programmable integrated circuit.

Another arrangement includes a computer program product having a computer readable storage medium with program code stored thereon. The program code is executable by a processor to perform operations. The operations include determining, using the processor, critical feed-forward paths of the circuit design and determining, using the processor, a sequential loop having a largest loop delay within the circuit design. The operations also may include iteratively cutting, using the processor, the critical feed-forward paths and feed-forward paths parallel to the cut critical feed-forward paths until a stopping condition determined according to the largest loop delay is met. The operations may also include modifying, using the processor, the circuit design by inserting a register at each cut feed-forward path.

In one aspect, the stopping condition further includes determining that a maximum operating frequency of the circuit design meets a design requirement.

In another aspect, the stopping condition further includes determining that a delay of a most critical feed-forward path of the clock domain no longer exceeds a delay of an atomic circuit block of the circuit design.

The determining critical feed-forward paths, the determining a sequential loop having a largest loop delay, and the iteratively cutting may be performed on a per-clock domain basis.

The processor may be configured to perform operations further including sorting the critical feed-forward paths according to slack and selecting critical feed-forward paths for cutting according to worst slack.

In a further aspect, the determining critical feed-forward paths, the determining a sequential loop having a largest loop delay, the iteratively cutting, and the modifying the circuit design are performed subsequent to synthesis of the circuit design.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of improving timing of a circuit design, comprising:
   determining, using a processor, critical feed-forward paths of the circuit design;
   determining, using the processor, a sequential loop having a largest loop delay within the circuit design;
   iteratively cutting, using the processor, the critical feed-forward paths and feed-forward paths parallel to the cut critical feed-forward paths until a stopping condition determined according to the largest loop delay;
   selecting a feed-forward path for the cutting from a plurality of feed-forward paths that are functionally equivalent options for register insertion based upon sequential loops following each of the plurality of feed-forward paths; and
   modifying, using the processor, the circuit design by inserting a register at each cut feed-forward path.

2. The method of claim 1, wherein the stopping condition comprises determining that a maximum operating frequency of the circuit design meets a design requirement.

3. The method of claim 1, wherein the stopping condition comprises determining that a delay of a most critical feed-forward path of the clock domain no longer exceeds a delay of an atomic circuit block of the circuit design, wherein the atomic circuit block is a selected circuit block that cannot be broken down into constituent circuit elements.

4. The method of claim 1, wherein the determining critical feed-forward paths, the determining a sequential loop having a largest loop delay, and the iteratively cutting are performed on a per-clock domain basis.

5. The method of claim 1, further comprising:
   sorting the critical feed-forward paths according to slack and selecting critical feed-forward paths for cutting according to worst slack.

6. The method of claim 1, wherein the determining critical feed-forward paths, the determining a sequential loop having a largest loop delay, the iteratively cutting, and the modifying the circuit design are performed subsequent to synthesis of the circuit design.

7. The method of claim 1, wherein the feed-forward path selected from the plurality of feed-forward paths has fewest sequential loops that follow.

8. An apparatus for improving timing of a circuit design, comprising:
   a processor configured to initiate executable operations including:
   determining critical feed-forward paths of the circuit design;
   determining a sequential loop having a largest loop delay within the circuit design;
   iteratively cutting the critical feed-forward paths and feed-forward paths parallel to the cut critical feed-forward paths until a stopping condition determined according to the largest loop delay is met;
   selecting a feed-forward path for the cutting from a plurality of feed-forward paths that are functionally equivalent options for register insertion based upon sequential loops following each of the plurality of feed-forward paths; and
   modifying the circuit design by inserting a register at each cut feed-forward path.

9. The apparatus of claim 8, wherein the stopping condition comprises determining that a maximum operating frequency of the circuit design meets a design requirement.

10. The apparatus of claim 8, wherein the stopping condition comprises determining that a delay of a most critical feed-forward path of the clock domain no longer exceeds a delay of an atomic circuit block of the circuit design wherein the atomic circuit block is a selected circuit block that cannot be broken down into constituent circuit elements.

11. The apparatus of claim 8, wherein the determining critical feed-forward paths, the determining a sequential loop having a largest loop delay, and the iteratively cutting are performed on a per-clock domain basis.

12. The apparatus of claim 8, wherein the processor is configured to initiate executable operations further comprising:
   sorting the critical feed-forward paths according to slack and selecting critical feed-forward paths for cutting according to worst slack.

13. The apparatus of claim 8, wherein the determining critical feed-forward paths, the determining a sequential loop having a largest loop delay, the iteratively cutting, and the modifying the circuit design are performed subsequent to synthesis of the circuit design.

14. The apparatus of claim 8, wherein the feed-forward path selected from the plurality of feed-forward paths has fewest sequential loops that follow.

15. A computer program product comprising a computer readable storage medium having program code stored thereon, the program code executable by a processor to perform operations comprising:
   determining, using the processor, critical feed-forward paths of the circuit design;
   determining, using the processor, a sequential loop having a largest loop delay of the circuit design;
   iteratively cutting, using the processor, the critical feed-forward paths and feed-forward paths parallel to the cut critical feed-forward paths until a stopping condition determined according to the largest loop delay is met;
   selecting a feed-forward path for the cutting from a plurality of feed-forward paths that are functionally equivalent options for register insertion based upon sequential loops following each of the plurality of feed forward paths; and
   modifying, using the processor, the circuit design by inserting a register at each cut feed-forward path.

16. The computer program product of claim 15, wherein the stopping condition comprises determining that a maximum operating frequency of the circuit design meets a design requirement.

17. The computer program product of claim 15, wherein the stopping condition comprises determining that a delay of a most critical feed-forward path of the clock domain no longer exceeds a delay of an atomic circuit block of the circuit design wherein the atomic circuit block is a selected circuit block that cannot be broken down into constituent circuit elements.

18. The computer program product of claim 15, wherein the determining critical feed-forward paths, the determining a sequential loop having a largest loop delay, and the iteratively cutting are performed on a per-clock domain basis.

19. The computer program product of claim 15, wherein the feed-forward path selected from the plurality of feed-forward paths has fewest sequential loops that follow.

20. The computer program product of claim 15, wherein the determining critical feed-forward paths, the determining a sequential loop having a largest loop delay, the iteratively cutting, and the modifying the circuit design are performed subsequent to synthesis of the circuit design.

\* \* \* \* \*